(12) United States Patent
Yu et al.

(10) Patent No.: US 8,946,930 B2
(45) Date of Patent: Feb. 3, 2015

(54) UNINTERRUPTIBLE POWER SUPPLY HAVING AN INTEGRATED TRANSFORMER

(75) Inventors: Chi-Hsien Yu, Taipei (TW); Yung-Mei Lin, Taipei (TW)

(73) Assignee: Cyber Power Systems Inc., Taipei (TW)

( * ) Notice: Subject to any disclaimer, the term of this patent is extended or adjusted under 35 U.S.C. 154(b) by 870 days.

(21) Appl. No.: 13/175,019

(22) Filed: Jul. 1, 2011

(65) Prior Publication Data

US 2013/0002028 A1    Jan. 3, 2013

(51) Int. Cl.
*H02J 9/00*    (2006.01)
(52) U.S. Cl.
CPC ....................................... *H02J 9/00* (2013.01)
USPC ........................................................... 307/64
(58) Field of Classification Search
USPC ........................................................... 307/64
See application file for complete search history.

(56) References Cited

U.S. PATENT DOCUMENTS

| | | | |
|---|---|---|---|
| 6,208,529 B1 * | 3/2001 | Davidson | 363/17 |
| 2009/0212758 A1 * | 8/2009 | Asinovski et al. | 323/355 |
| 2010/0141035 A1 * | 6/2010 | Chen et al. | 307/64 |

* cited by examiner

*Primary Examiner* — Jared Fureman
*Assistant Examiner* — Joseph Inge
(74) *Attorney, Agent, or Firm* — C. G. Mersereau; Nikolai & Mersereau, P.A.

(57) ABSTRACT

An interruptible power supply (UPS) has a surge cancellation and electromagnetic interference (EMI) prevention device, a charger, a battery set and a power converter. The power converter has multiple power switches, an integrated transformer and a controller. An input terminal of the surge cancellation and EMI prevention device is connected with the AC mains, and an output terminal is connected with the integrated transformer. The charger is connected with the battery set. The battery set is connected with the power switches. The integrated transformer has a primary side having a first winding and a second winding serially connected. The first and second windings respectively have multiple sub-windings. The first winding is connected with the power switches. The second winding is connected with a power output terminal and shares a part of the first winding, thereby decreasing turns of the windings and reducing the size and cost of the UPS.

8 Claims, 7 Drawing Sheets

UNINTERRUPTIBLE POWER SUPPLY HAVING AN INTEGRATED TRANSFORMER

BACKGROUND OF THE INVENTION

1. Field of the Invention

The present invention relates to an uninterruptible power supply (UPS), and more particularly to a UPS having an integrated transformer with a commonly shared winding, and reducing turns of the winding and the size and cost of the transformer.

2. Description of the Related Art

Uninterruptible power supplies (UPS) are the power backup equipment serving to supply backup power to power-consuming equipment when the AC mains is abnormal, such as power outage, overvoltage/undervoltage, occurrence of surge current and the like, so as to continuously supply an operating power to the power-consuming equipment and prevent some mission-critical equipment, such as computers, telecommunication networks, private branch exchanges (PBX) and the like, from losing data or getting out of control.

With reference to FIG. 6, a conventional UPS has a surge cancellation and electromagnetic interference (EMI) prevention device 81, a charger 82, a battery set 83, a full-bridge converter 84 and an automatic voltage regulator (AVR) 85.

The surge cancellation and EMI prevention device 81 has an input terminal and an output terminal. The input terminal of the surge cancellation and EMI prevention device 81 is connected with the AC mains.

The charger 82 has an input terminal and an output terminal. The input terminal of the charger 82 is connected with the output terminal of the surge cancellation and EMI prevention device 81.

The battery set is connected with the output terminal of the charger 82.

The full-bridge converter 84 has four power switches G1, G2, G3 and G4, a transformer T and a controller (not shown). Each of the two power switches G1 and G3 and the other two power switches G2 and G4 are connected in pairs. The transformer T has a primary winding and a secondary winding. Two ends of the primary winding are respectively connected to the two pairs of the power switches. The secondary winding has two sub-windings separated from each other.

The automatic voltage regulator 85 has two switches 851, 852. Each switch 851, 852 has two contact points and one common point. The common point is selectively connected with one of the contact points of a corresponding switch 851, 852. The connected contact points of the switches 851, 852 are further connected to the secondary winding of the transformer T. The common point of the switch 851 is serially connected with an input switch and is further connected to the output terminal of the surge cancellation and EMI prevention device 81. The common point of the other switch 852 is connected to a power output terminal.

The power output terminal is connected to a power-consuming equipment. When the AC mains is normal, the mains power not only charges the battery set 83 through the surge cancellation and EMI prevention device 81 and the charger 82 but also directly supplies power to the power-consuming equipment through the automatic voltage regulator 85. When the AC mains fails or is abnormal, the power switches G1, G2, G3 and G4 of the full-bridge converter 84 are driven by the controller to convert the DC power from the battery set 83 into AC power in collaboration with the transformer T and supplies the AC power to the power-consuming equipment. The automatic voltage regulator 85 is also under the control of the controller to boost or buck voltage under a battery mode.

Currently the full-bridge converter 84 usually adopts an isolation transformer. The isolation transformer has a primary winding and a secondary winding. The so-called isolation transformer means that the primary winding and the secondary winding are fully insulated and isolated. To ensure that the primary winding and the secondary winding are fully isolatedly insulated, besides being insulated, the primary winding and the secondary winding should be spaced with a safe distance from each other. Meanwhile, the turns of windings cannot be further reduced. Accordingly, the size and cost of the transformer cannot be effectively reduced.

With reference to FIG. 7, another conventional UPS is shown. The UPS differs from the foregoing conventional UPS in that it adopts a push pull converter 86. The push pull converter 86 has two power switches G1, G2, a transformer and a controller (not shown). The two power switches G1, G2 are controlled by the controller and are connected with the primary winding of the transformer T. The other difference lies in that an input terminal of the charger 82 is connected with a primary auxiliary winding of the transformer T to acquire an operating power for the purpose of charging.

The UPS having the push pull converter 86 still adopts an isolation transformer, and the same bulky problem of the UPS adopting the full-bridge converter is still present. Furthermore, besides having two sub-windings, the primary winding of the transformer further has an auxiliary winding. As all the sub-windings and the auxiliary winding on the primary side are required to be independent and completely insulated and isolated, the size and cost of the UPS cannot be effectively reduced.

SUMMARY OF THE INVENTION

An objective of the present invention is to provide a UPS having an integrated transformer with a commonly shared winding, and reducing turns of the winding and the size and cost of the transformer.

To achieve the foregoing objective, the UPS has a set of power output terminals, a surge cancellation and electromagnetic interference (EMI) prevention device, a charger, a battery set and a power converter.

The surge cancellation and electromagnetic interference (EMI) prevention device has an input terminal and an output terminal. The input terminal is adapted to connect with the AC mains.

The charger has an input terminal and an output terminal. The input terminal is adapted to connect with the AC mains.

The battery set is connected with the output terminal of the charger.

The power converter has a set of power switches and an integrated transformer. The integrated transformer has a primary side and a secondary side. The primary side has a first winding connected with the set of power switches, and is composed of at least one sub-winding. The second winding is serially connected with the first winding, is connected with the set of power output terminals, and is composed of at least one sub-winding.

Unlike the primary winding and the secondary winding of a conventional isolation transformer in a UPS, the first winding and the second winding of the present invention are directly coupled without requiring space for mutual insulation and isolation. Additionally, the first winding and the second winding commonly share a part of the windings. Accordingly, the turns of windings can be decreased, and the size and cost of the integrated transformer can be relatively reduced.

Other objectives, advantages and novel features of the invention will become more apparent from the following detailed description when taken in conjunction with the accompanying drawings.

DETAILED DESCRIPTION OF THE INVENTION

Figure 1:
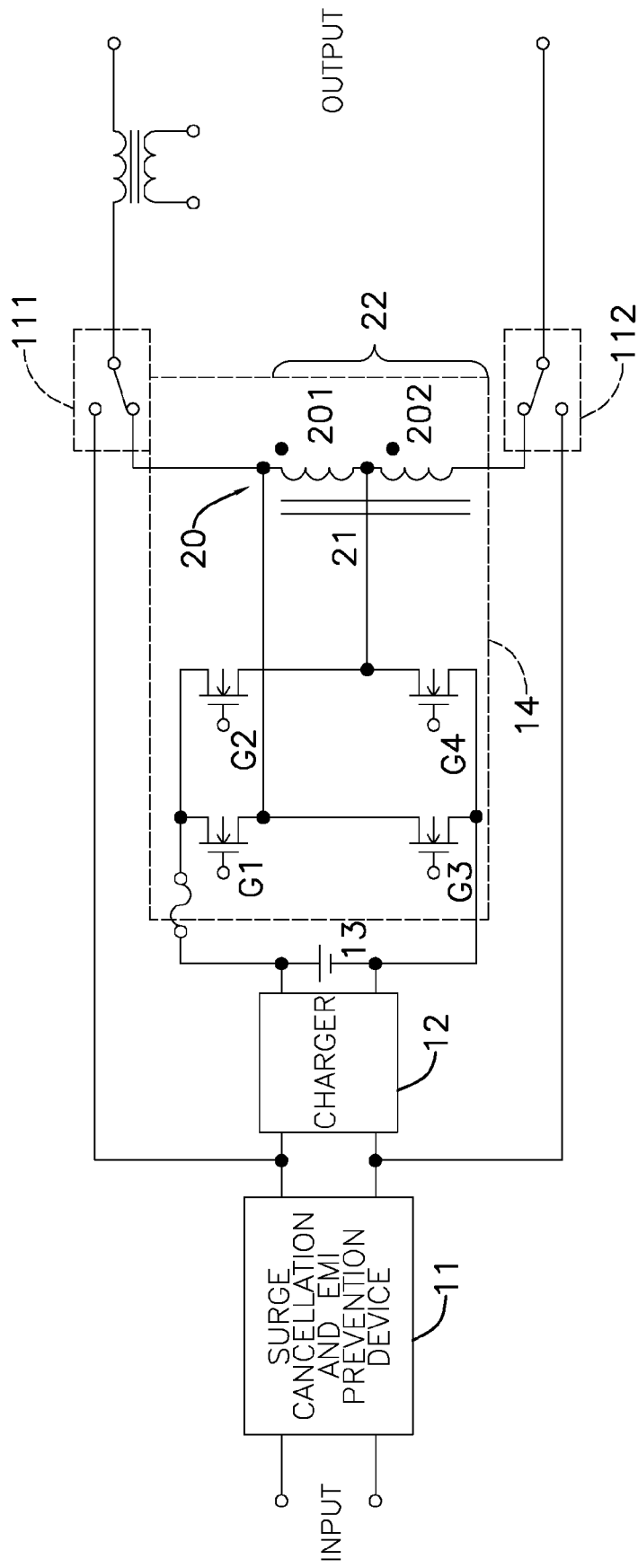
FIG. 1 is a circuit diagram of a first embodiment of a UPS having an integrated transformer in accordance with the present invention.

With reference to FIG. 1, a first embodiment of a UPS having an integrated transformer in accordance with the present invention has a surge cancellation and EMI prevention device 11, a charger 12, a battery set 13 and a full-bridge converter 14.

The surge cancellation and EMI prevention device 11 has an input terminal and an output terminal. The input terminal of the surge cancellation and EMI prevention device 11 is connected with the AC mains. In the present embodiment, the output terminal of the surge cancellation and EMI prevention device 11 is connected with a set of power output terminals through two input switches 111, 112.

The charger 12 has an input terminal and an output terminal. The input terminal of the charger 12 is connected to the AC mains. In the present embodiment, the input terminal is connected with an output terminal of the surge cancellation and EMI prevention device 11.

The battery set 13 is connected with the output terminal of the charger 12 so that the DC power converted and outputted by the charger 12 charges the battery set 13.

The full-bridge converter 14 has two upper arm switches G1, G2 and two lower arm switches G3, G4 respectively and serially connected with the upper arm switches G1, G3, an integrated transformer 20 and a controller (not shown). Each of the upper arm power switches G1, G2 and the lower arm power switches G3, G4 may be composed of a power switch set having multiple parallelly connected power switches. The gate of each of the upper arm switches G1, G2 and the lower arm switches G3, G4 is connected with an output terminal of the controller and controlled by the controller. The integrated transformer 20 has a primary side having a first sub-winding 201 and a second sub-winding 202 serially connected. Each of the first and second sub-windings 201, 202 has a first end and a second end. The first end of the second sub-winding 202 is connected with the second end of the first sub-winding 201. The first end of the first sub-winding 201 and the second end of the first sub-winding 201 are respectively connected to two serial nodes of the two upper arm switches G1, G2 and the two lower arm switches G3, G4 to constitute a first winding 21. The first end of the first sub-winding 201 and the second end of the second sub-winding 202 are respectively connected with the input switches 111, 112. The first end of the first sub-winding and the second end of the second sub-winding are connected with the set of power output terminals to constitute the second winding 22.

When the AC mains is normal, the two input switches 111, 112 are switched so that the output terminal of the surge cancellation and EMI prevention device 11 is connected with the power output terminal. The mains power supplies a load connected with the set of power output terminals through the surge cancellation and EMI prevention device 11 and charges the battery set 13 through the charger 12. When the AC mains fails, the two input switches 111, 112 are switched so that the set of power output terminals is connected with the full-bridge converter 14. The DC power of the battery set 13 is outputted to the full-bridge converter 14 and converted into AC power supplied to the load through the set of power output terminals. It is noted that the first winding 21 of the integrated transformer 20 serves as the primary winding of a conventional isolation transformer and the second winding 22 serves as the secondary winding of the isolation transformer. As the second winding 22 shares the first sub-winding 201 with the first winding 21, the turns of the second winding 22 can be totally removed.

Figure 2:
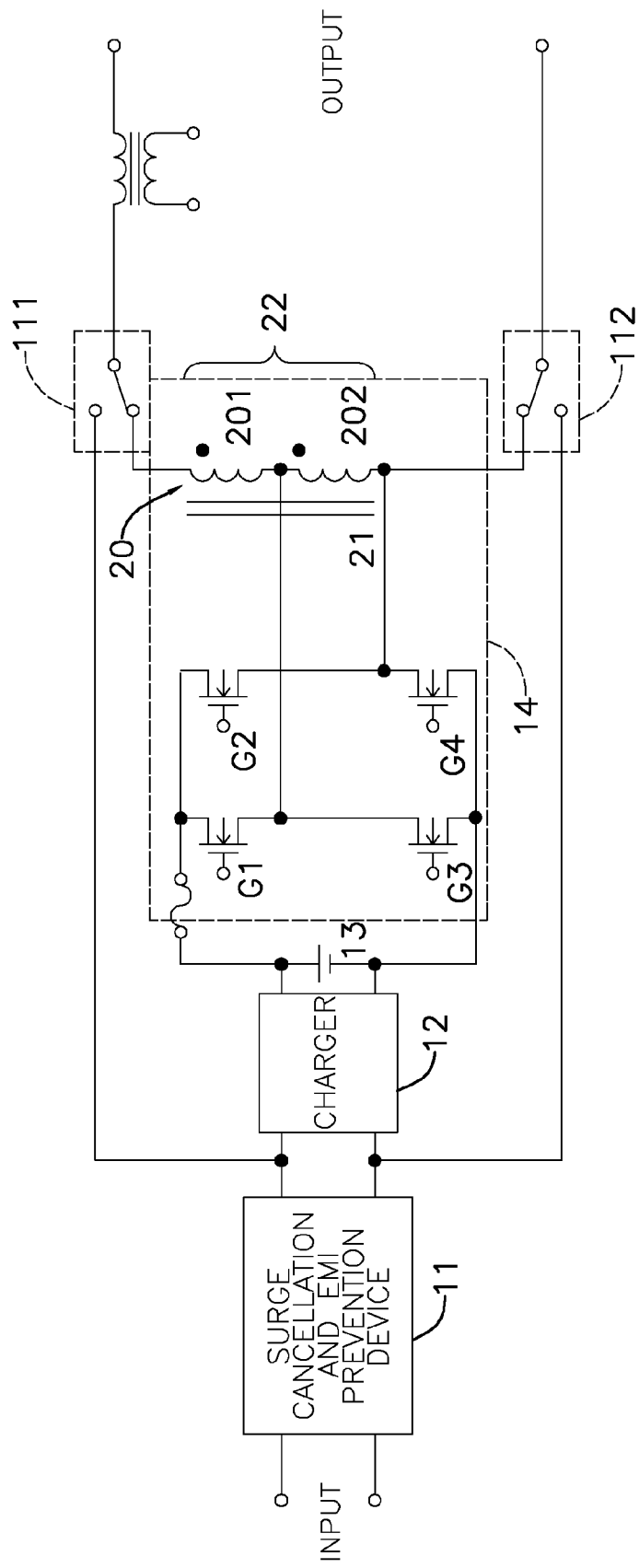
FIG. 2 is a circuit diagram of a second embodiment of a UPS having an integrated transformer in accordance with the present invention.

With reference to FIG. 2, a second embodiment of a UPS having an integrated transformer in accordance with the present invention is shown. The present embodiment differs from the first embodiment in that the first end of the second sub-winding 202 and the second end of the second sub-winding 202 are respectively connected to the two upper arm switches G1, G2 and the lower arm switches G3, G4 to constitute a first winding 21, and the first end of the first winding 201 and the second end of the second sub-winding 202 are connected with the set of power output terminals to constitute the second winding. Similarly, the second winding still shares the second sub-winding 202 with the first winding 21.

Figure 3:
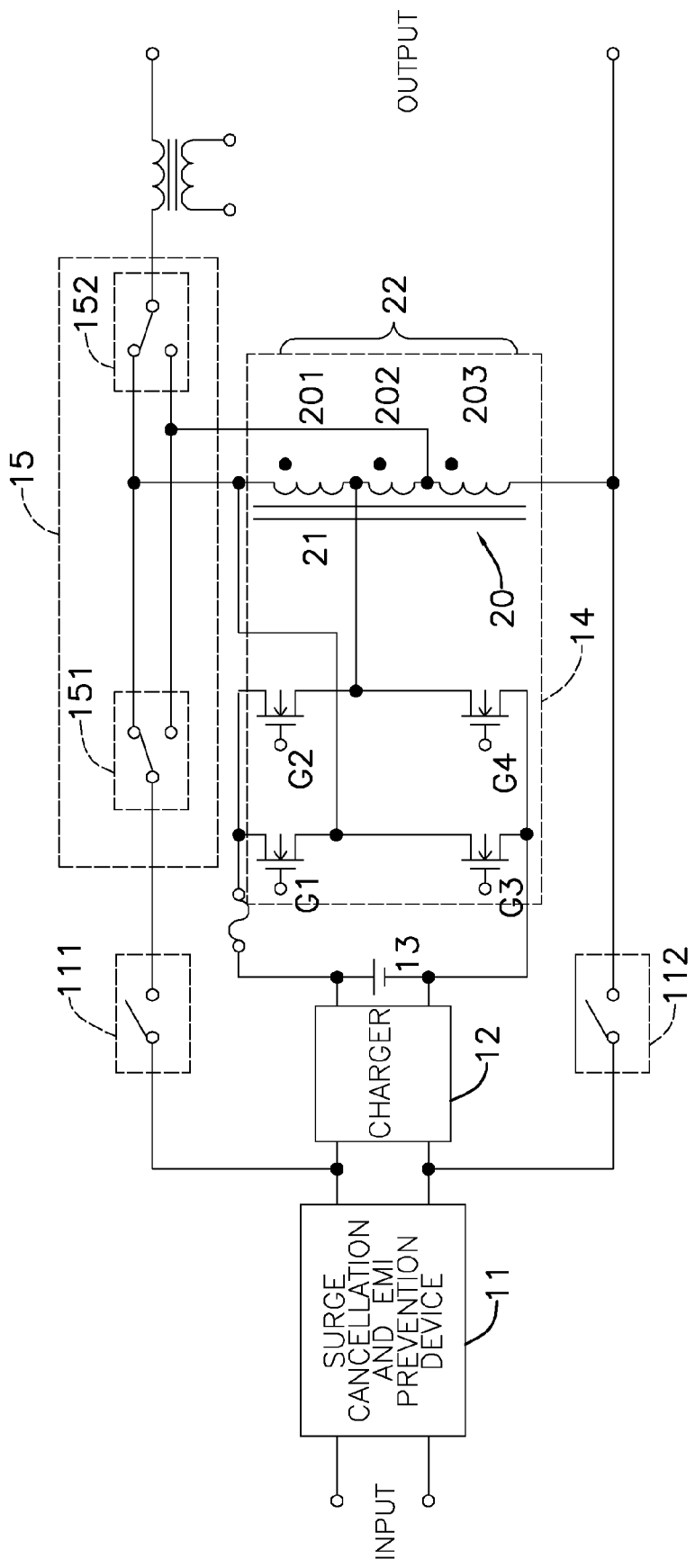
FIG. 3 is a circuit diagram of a third embodiment of a UPS having an integrated transformer in accordance with the present invention.

With reference to FIG. 3, a third embodiment of a UPS having an integrated transformer in accordance with the present invention differs from the foregoing embodiments in that the primary side of the integrated transformer has a first sub-winding 201, a second sub-winding 202 and a third sub-winding 203 sequentially and serially connected, and the UPS further has an automatic voltage regulator 15. Each of the first, second and third sub-windings 201, 202, 203 has a first end and a second end. The automatic voltage regulator 15 has a first switch 151 and a second switch 152. Each of the first switch 151 and the second switch 152 has two contact points and a common point. The common point is selectively connected with one of the contact points of each switch. After the common point of the first switch 151 is serially connected with a corresponding input switch 111 and the output terminal of the surge cancellation and EMI prevention device 11 and the common point of the second switch 152 is connected with the set of power output terminals, the first end of the first sub-winding 201 and the second end of the first sub-winding 201 are respectively connected to two serial nodes of the upper arm switches G1, G2 and the lower arm switches G3, G4 to constitute a first winding 21. The first end of the first sub-winding 201 and the second end of the second sub-winding 202 are respectively connected with the corresponding contact points of the first and second switches 151, 152. The first end of the first sub-winding 201 and the second end of the third sub-winding 203 are connected with the set of power output terminals to constitute the second winding 22.

When the UPS boosts voltage with the automatic voltage regulator 15, the first switch 151 is switched to a corresponding contact point to connect with the first end of the third sub-winding 203, and the second switch 152 is switched to a corresponding contact point to connect with the first end of the first sub-winding 201. When generating and outputting an induced voltage, the second winding 22 shares the first sub-winding 201 of the first winding 21. When the UPS bucks voltage with the automatic voltage regulator 15, the first switch 151 is switched to a corresponding contact point to connect with the first end of the first sub-winding 201, and the second switch 152 is switched to a corresponding contact point to connect with the first end of the third sub-winding 203. When generating and outputting an induced voltage, the second winding 22 only shares the third sub-winding 203 with the first winding 21.

Figure 5:
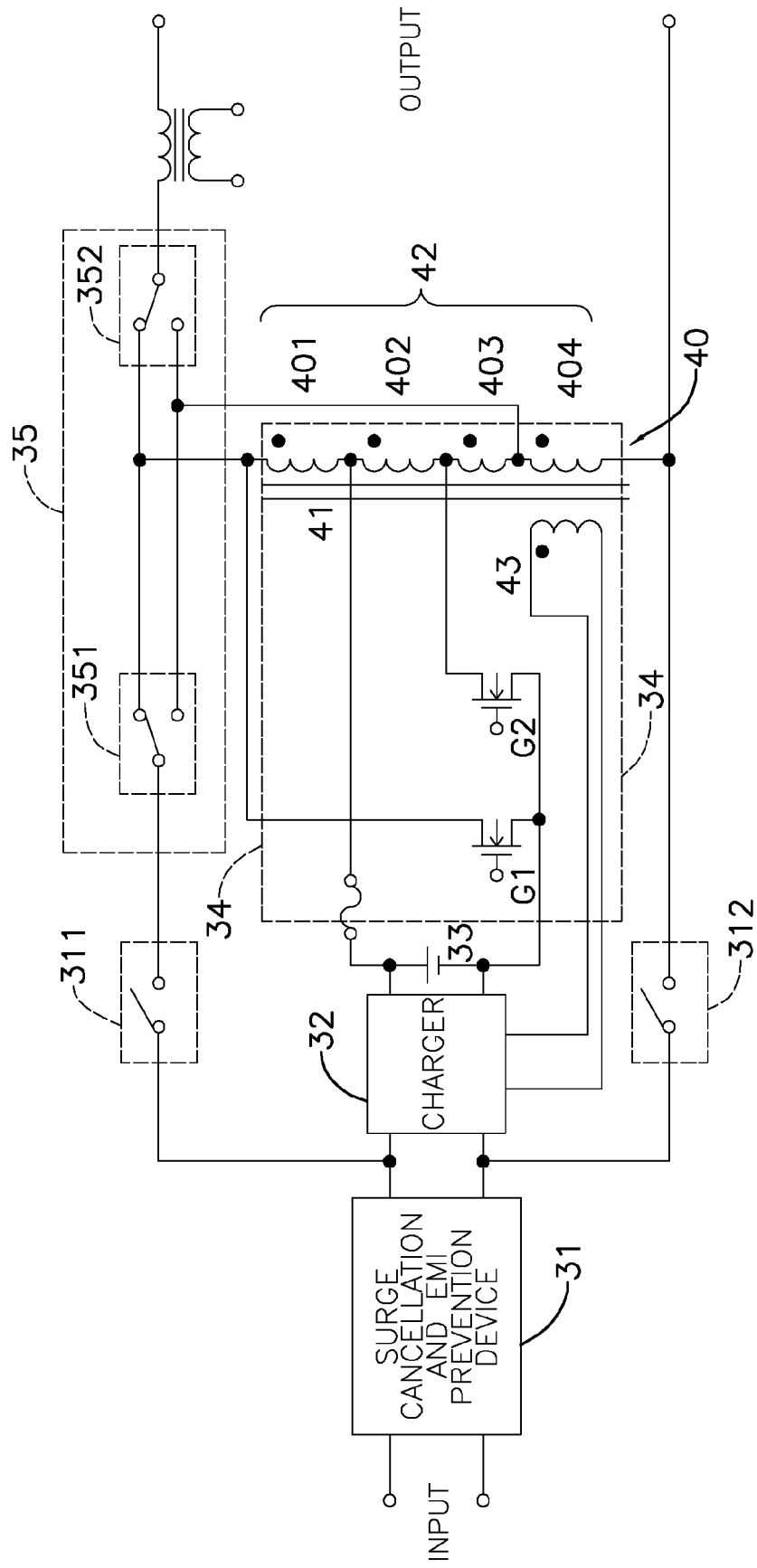
FIG. 5 is a circuit diagram of a fifth embodiment of a UPS having an integrated transformer in accordance with the present invention.
Figure 6:
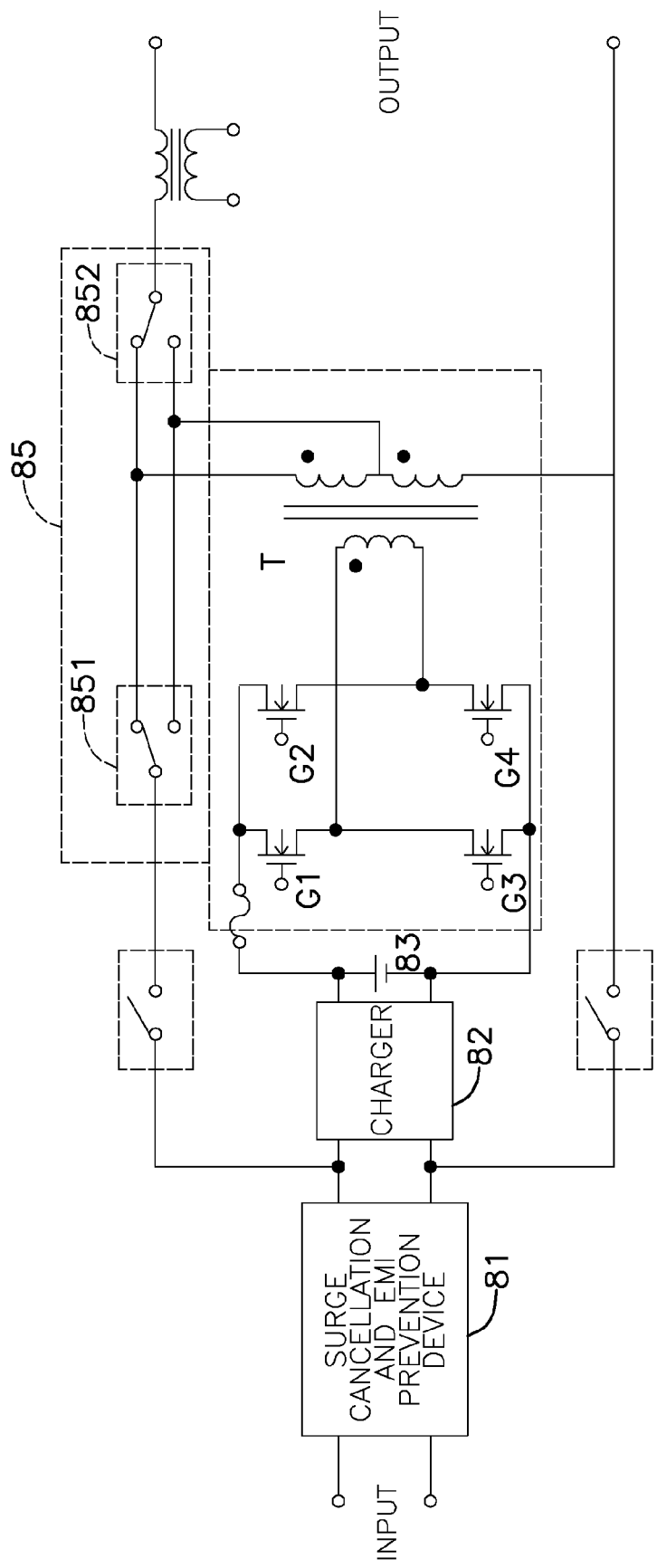
FIG. 6 is a circuit diagram of a conventional UPS.
Figure 7:
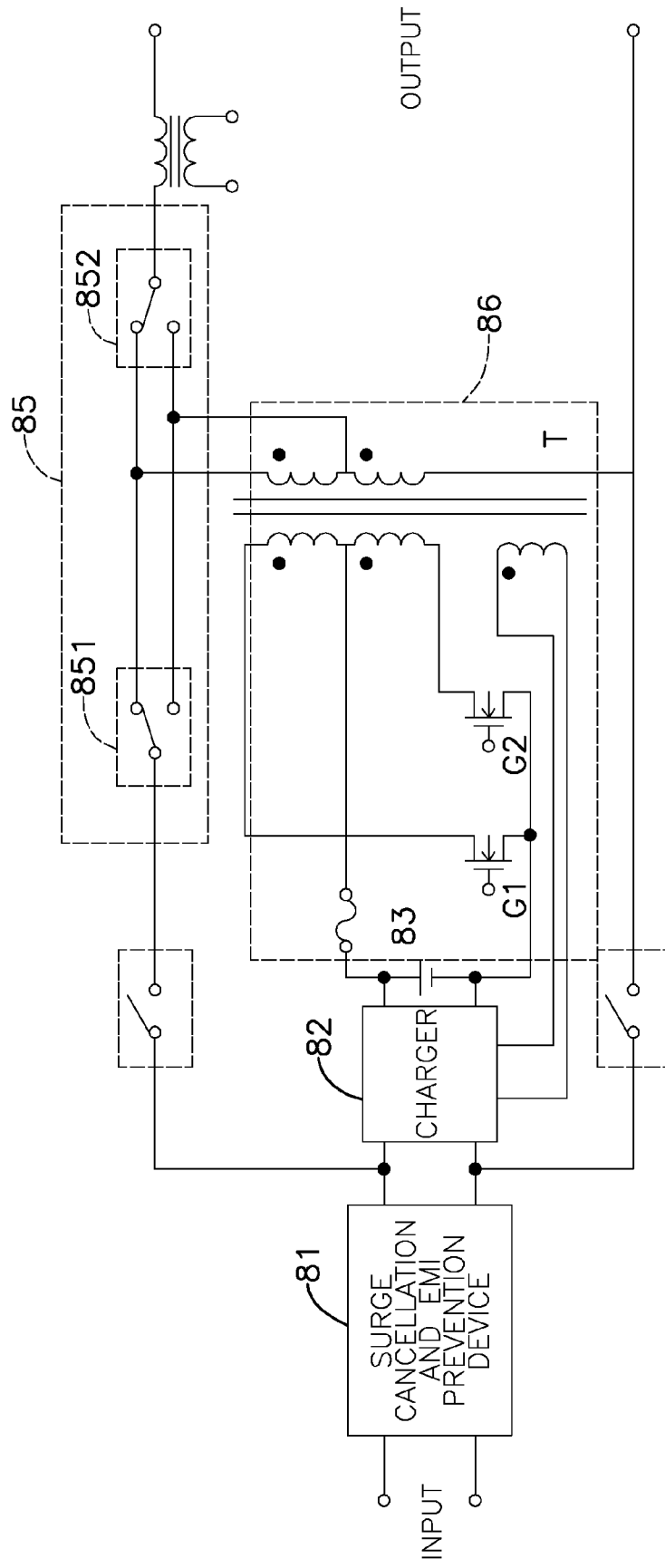
FIG. 7 is a circuit diagram of another conventional UPS.

The input terminal of the charger 12 in the first to the third embodiment is connected with the output terminal of the surge cancellation and EMI prevention device 11. An input power of the charger 12 may be supplied by the auxiliary winding of the integrated transformer 40 as shown in FIG. 5.

Figure 4:
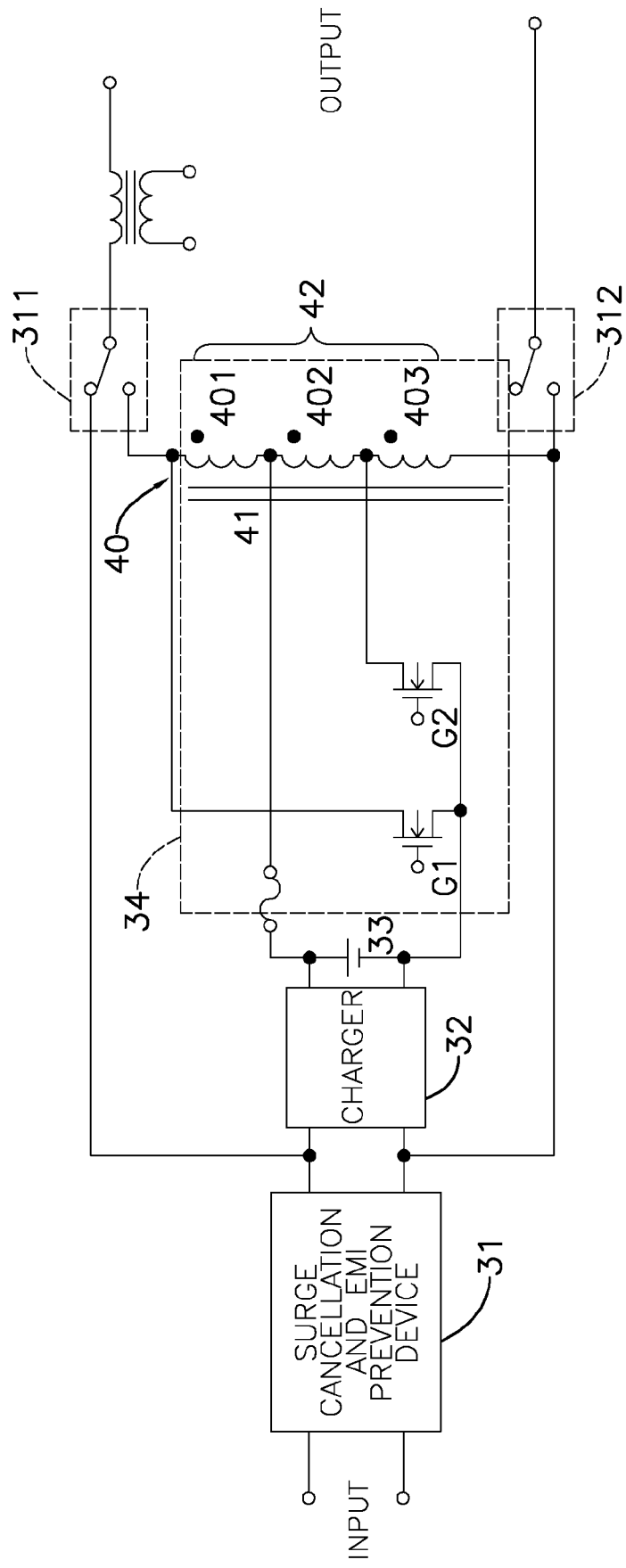
FIG. 4 is a circuit diagram of a fourth embodiment of a UPS having an integrated transformer in accordance with the present invention.

With reference to FIG. 4, a fourth embodiment of a UPS having an integrated transformer in accordance with the present invention has a surge cancellation and EMI prevention device 31, a charger 32, a battery set 33 and a push pull converter 34.

The surge cancellation and EMI prevention device 31 has an input terminal and an output terminal. The input terminal of the surge cancellation and EMI prevention device 31 is connected with the AC mains. In the present embodiment, the output terminal of the surge cancellation and EMI prevention device 31 is connected with a set of power output terminals through two input switches 311, 312.

The charger 32 has an input terminal and an output terminal. The input terminal of the charger 32 is connected with the output terminal of the surge cancellation and EMI prevention device 31.

The battery set 33 is connected with the output terminal of the charger 32 so that DC power outputted by the charger 32 directly charges the battery set 33.

The push pull converter 34 has two power switches G1, G2, an integrated transformer 40 and a controller (not shown). Each of the power switches G1, G2 is composed of a power switch set having multiple parallelly connected power switches to increase a current flow capacity. The gate of each of the power switches G1, G2 is connected with an output terminal of the controller and is controlled by the controller. The integrated transformer 40 has a primary side having a first sub-winding 401, a second sub-winding 402 and a third sub-winding 403 sequentially and serially connected. Each of the first, second and third sub-windings 401, 402, 403 has a first end and a second end. The first end and the second end of the second sub-winding 402 are respectively connected with the second end of the first sub-winding 401 and the first end of the third sub-winding 403. The first end of the first sub-winding 401 and the second end of the second sub-winding 402 are respectively connected with the power switches G1, G2 to constitute a first winding 41. The first end of the first sub-winding 401 and the second end of the third sub-winding 403 are connected to the set of power output terminals respectively through the input switches 311, 312 to constitute a second winding 42. When generating and outputting an induced voltage, the second winding 22 shares the first sub-winding 401 and the second sub-winding 402 with the first winding 41.

The first end of the second sub-winding 402 and the second end of the third sub-winding 403 may be respectively connected with the power switches G1, G2 to constitute the first winding 41. The first sub-winding 401, the second sub-winding 402 and the third sub-winding 403 still commonly constitute a second winding 42. Similarly, the second winding 42 shares the second sub-winding 402 and the third sub-winding 403 with the first winding 41.

In the present embodiment, the input terminal of the charger 32 is connected with the output terminal of the surge cancellation and EMI prevention device 11. An input power of the charger 12 may be supplied by the auxiliary winding of the integrated transformer 40 as shown in FIG. 5.

With reference to FIG. 5, a fifth embodiment of a UPS having an integrated transformer in accordance with the present invention differs from the fourth embodiment in that the UPS further has an automatic voltage regulator 35 and the primary side of the integrated transformer 40 has a first sub-winding 401, a second sub-winding 402, a third sub-winding 403 and a fourth sub-winding 404 sequentially and serially connected. The automatic voltage regulator 35 has a first switch 351 and a second switch 352. Each of the first switch 351 and the second switch 352 has two contact points and one common point. The common point is selectively connected with one of the contact points of each of the first switch 351 and the second switch 352. The common point of the first switch 351 is serially connected with a corresponding input switch 311 and is further connected to the output terminal of the surge cancellation and EMI prevention device 31. The common point of the second switch 352 is connected to the set of power output terminals. The first end of the first sub-winding 401 and the second end of the second sub-winding 402 are respectively connected with the power switches G1, G2 to constitute a first winding 41. The first end of the first sub-winding 401 and the second end of the third sub-winding 403 are respectively connected with the corresponding contact points of the first and second switches 351, 352. The first sub-winding 401, second sub-winding 402, third sub-winding 403 and fourth sub-winding 404 commonly constitute a second winding 42.

During a battery mode, when the automatic voltage regulator 35 boosts voltage (the first end of the first sub-winding 401 is connected with a corresponding contact point of the second switch 352 and the first end of the fourth sub-winding 404 is connected with a corresponding contact point of the first switch), the second winding 42 generates and outputs an induced voltage with the first sub-winding 401, second sub-winding 402, third sub-winding 403 and fourth sub-winding 404, and thus shares the first and second sub-windings 401, 402 with the first winding 41.

The present embodiment differs from the fourth embodiment in that the input terminal of the charger 32 of the present embodiment is connected with the output terminal of the surge cancellation and EMI prevention device 31 and the input power of the charger 32 may be supplied by the auxiliary winding 43 of the integrated transformer 40. Due to the addition of the auxiliary winding 43, the integrated transformer 40 further has a secondary side insulated and isolated from the primary side. The secondary side has the auxiliary winding 43 connected with the input terminal of the charger 32. Despite the auxiliary winding 43 added to the secondary side and isolated from the primary side, the second winding 42 on the primary side still shares the first sub-winding 401 and the second sub-winding 402 of the first winding 41, thereby significantly decreasing the turns of entire windings and effectively reducing the size and cost of the transformer.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An uninterruptible power supply (UPS) having an integrated transformer, comprising:
a set of power output terminals;
a surge cancellation and electromagnetic interference (EMI) prevention device having:
an input terminal adapted to connect with the AC mains; and
an output terminal connected with the set of power output terminals through two input switches;
a charger having:
an input terminal adapted to connect with the AC mains; and
an output terminal;
a battery set connected with the output terminal of the charger;
a power converter being a full-bridge converter and having:
a set of power switches with two upper arm switches and two lower arm switches respectively and serially connected to the upper arm switches; and
an integrated transformer having a primary side, wherein the primary side has:
a first winding connected with the set of power switches, wherein the primary side has a first sub-winding, a second sub-winding and a third sub-winding serially connected, each of the first, second and third sub-windings has a first end and a second end, wherein the first end of the first sub-winding and the second end of the first sub-winding are respectively connected to two serial nodes of the two upper arm switches and the two lower arm switches to constitute the first winding; and
a second winding serially connected with the first winding, and connected with the set of power output terminals, wherein the first end of the first sub-winding and the second end of the third sub-winding are connected with the set of power output terminals to constitute the second winding; and
an automatic voltage regulator having a first switch and a second switch, wherein each of the first switch and the second switch has two contact points and a common point, the common point is selectively connected with one of the contact points, the common point of the first switch is serially connected with one of the input switches and then connected with the output terminal of the surge cancellation and EMI prevention device, and the common point of the second switch is connected with the set of power output terminals, and the first end of the first sub-winding and the second end of the second sub-winding are respectively connected with the corresponding contact points of the first and second switches.

2. The UPS as claimed in claim 1, wherein
the input terminal of the charger is connected with the output terminal of the surge cancellation and EMI prevention device, and
the output terminal of the surge cancellation and EMI prevention device is connected to the set of power output terminals through the input switches.

3. The UPS as claimed in claim 1, wherein the integrated transformer further has a secondary side isolatedly insulated from the primary side, and the secondary side has an auxiliary winding connected with the input terminal of the charger.

4. The UPS as claimed in claim 1, wherein each of the power switches of the power converter is composed of a power switch set having multiple power switches parallelly connected.

5. An uninterruptible power supply (UPS) having an integrated transformer, comprising:
a set of power output terminals;
a surge cancellation and electromagnetic interference (EMI) prevention device having:
an input terminal adapted to connect with the AC mains; and
an output terminal connected with the set of power output terminals through two input switches;
a charger having:
an input terminal adapted to connect with the AC mains; and
an output terminal;
a battery set connected with the output terminal of the charger;
a power converter being a push pull converter and having:
two power switches; and
an integrated transformer having a primary side, wherein the primary side has:
a first winding connected with the two power switches, wherein the primary side of the integrated transformer has a first sub-winding, a second sub-winding, a third sub-winding and a fourth sub-winding sequentially and serially connected, each of the first sub-winding, the second sub-winding, the third sub-winding and the fourth sub-winding has a first end and a second end, wherein the first end of the first sub-winding is connected with one of the power switches of the push pull converter, and the second end of the second sub-winding is connected with the other power switch of the push pull converter to constitute the first winding; and
a second winding serially connected with the first winding, and connected with the set of power output terminals, wherein the first end of the first sub-winding and the second end of the fourth sub-winding are connected with the set of power output terminals to constitute the second winding; and
an automatic voltage regulator having a first switch and a second switch, wherein each of the first switch and the second switch has two contact points and a common point, the common point is selectively connected with one of the contact points, the common point of the first switch is serially connected with one of the input switches and then connected with the output terminal of the surge cancellation and EMI prevention device and the common point of the second switch is connected with the set of power output terminals, and the first end of the first sub-winding and the second end of the third sub-winding are respectively connected with the corresponding contact points of the first and second switches.

6. The UPS as claimed in claim 5, wherein the integrated transformer further has a secondary side isolatedly insulated from the primary side, and the secondary side has an auxiliary winding connected with the input terminal of the charger.

7. The UPS as claimed in claim 5, wherein
the input terminal of the charger is connected with the output terminal of the surge cancellation and EMI prevention device, and
the output terminal of the surge cancellation and EMI prevention device is connected to the set of power output terminals through the input switches.

8. The UPS as claimed in claim 5, wherein each of the power switches of the power converter is composed of a power switch set having multiple power switches parallelly connected.

* * * * *